(12) United States Patent
Kim et al.

(10) Patent No.: US 10,727,673 B2
(45) Date of Patent: *Jul. 28, 2020

(54) TRANSFORMERLESS POWER CONVERSION

(71) Applicant: Google LLC, Mountain View, CA (US)

(72) Inventors: Sangsun Kim, San Jose, CA (US); Anand Ramesh, Sunnyvale, CA (US); Scott Aldous, Palo Alto, CA (US); John Zipfel, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,534

(22) Filed: Aug. 26, 2019

(65) Prior Publication Data

US 2019/0379207 A1 Dec. 12, 2019

Related U.S. Application Data

(63) Continuation of application No. 15/968,502, filed on May 1, 2018, now Pat. No. 10,439,399, which is a (Continued)

(51) Int. Cl.
*H02J 3/32* (2006.01)
*H02J 3/38* (2006.01)
(Continued)

(52) U.S. Cl.
CPC .................. *H02J 3/32* (2013.01); *H02J 3/38* (2013.01); *H02J 3/382* (2013.01); *H02J 3/383* (2013.01);
(Continued)

(58) Field of Classification Search
CPC ......................................................... H02J 3/32
(Continued)

(56) References Cited

U.S. PATENT DOCUMENTS 6,665,158 B2    12/2003   Walter
10,439,399 B2 *   10/2019   Kim ....................... H02M 7/48
(Continued)

FOREIGN PATENT DOCUMENTS

CN     103888004     6/2014
EP      2595295      5/2013
(Continued)

OTHER PUBLICATIONS

IN Office Action in Indian Application No. 201847003573, dated Jan. 29, 2020, 8 pages (with English translation).
(Continued)

*Primary Examiner* — Joseph Chang
(74) *Attorney, Agent, or Firm* — Fish & Richardson P.C.

(57) ABSTRACT

A power system including a rectifier and an inverter. The rectifier has a plurality of phase input terminals and a plurality of rectifier output terminals that provide respective rectified outputs, rectifier circuitry that rectifies the signals on the phase input terminals to generate respective rectified outputs on the rectifier output terminals, a rectifier neutral to receive a power source neutral, and capacitors connected between the rectifier neutral and the rectifier output terminals. The inverter includes a respective plurality of inverter input terminals respectively connected to the rectifier output terminals, a plurality of inverter output terminals, and an inverter neutral. The rectifier neutral and the inverter neutral are coupled by a conductor to form a same neutral.

7 Claims, 4 Drawing Sheets

Related U.S. Application Data continuation of application No. 14/789,448, filed on Jul. 1, 2015, now Pat. No. 9,997,917.

(51) Int. Cl.
*H02M 7/48* (2007.01)
*H02M 5/458* (2006.01)
*H02M 1/12* (2006.01)
*H02J 9/06* (2006.01)

(52) U.S. Cl.
CPC ............... *H02M 7/48* (2013.01); *H02J 9/063* (2020.01); *H02M 5/4585* (2013.01); *H02M 2001/123* (2013.01)

(58) Field of Classification Search
USPC .......................................................... 307/82
See application file for complete search history.

(56) References Cited

U.S. PATENT DOCUMENTS

| | | |
|---|---|---|
| 2003/0155893 A1 | 8/2003 | Schreiber |
| 2004/0165408 A1 | 8/2004 | West |
| 2007/0211501 A1 | 9/2007 | Zargari |
| 2009/0267417 A1 | 10/2009 | Lee |
| 2010/0295374 A1 | 11/2010 | Nielsen et al. |
| 2011/0188272 A1 | 8/2011 | Smedley |
| 2014/0354056 A1 | 12/2014 | Chen et al. |
| 2016/0256950 A1 | 9/2016 | Madsen |

FOREIGN PATENT DOCUMENTS

| | | |
|---|---|---|
| JP | H 02168867 | 6/1990 |
| WO | WO 2013/185847 | 12/2013 |

OTHER PUBLICATIONS

Araujo et al. "Novel Grid-Connected Non-Isolated Converters for Photovoltaic Systems with Grounded Generator," IEEE Power Electronics Specialists Conference, Jun. 15, 2008, 8 pages.

International Search Report and Written Opinion in International Application No. PCT/US2016/039510, dated Oct. 25, 2016, 12 pages.

PCT International Preliminary Report on Patentability in International Application No. PCT/US2016/039510, dated Jan. 2, 2018, 8 pages.

* cited by examiner

TRANSFORMERLESS POWER CONVERSION

CROSS-REFERENCE TO RELATED APPLICATION

This application is a continuation application of U.S. patent application Ser. No. 15/968,502, titled "TRANSFORMERLESS POWER CONVERSION" and filed on May 1, 2018, which is a continuation application of U.S. patent application Ser. No. 14/789,448, titled "TRANSFORMERLESS POWER CONVERSION" and filed on Jul. 1, 2015. The disclosure of each of the foregoing applications are incorporated herein by reference in their entirety for all purposes.

BACKGROUND

This specification relates to system grounding for power sources.

Recent advances in technology have enabled many power systems, residential and commercial, to utilize alternative energy sources to supplement power for traditional power sources (e.g., the AC grid). The alternative energy sources can include photovoltaic, wind energy, battery, and/or generators. Alternative energy sources can provide additional power when a primary power source or traditional power source fails, and can also provide supplemental power to the power system when the power system incurs a power event (e.g., the load's demand exceeds the capacity of the primary power source, the voltage of the primary power source sags, etc.).

SUMMARY

In general, one innovative aspect of the subject matter described in this specification can be embodied in methods that include the actions of generating first and second rectified outputs using a rectifier with a first input and a second input connected respectively to a first and second output of a power source, capacitively coupling the first and second rectified outputs to a neutral, generating first and second AC outputs from the first and second rectified outputs, and capacitively coupling the first and second AC outputs to the neutral. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The systems and methods disclosed herein enable a power source neutral output to be connected to a utility side neutral that is safety grounded without galvanic isolation. The implemented topology is an inexpensive solution for coupling an AC source, such as a generator, to a DC bus, without requiring isolation. The power source neutral output can be coupled to the utility side neutral by utilizing a DC bus that is connected to the power source neutral and the utility side neutral. Grounding the power source neutral to the utility side neutral eliminates a ground current loop. Grounding the power source neutral facilitates the automatic clearing of ground fault by circuit protection devices (e.g. fuse or circuit breaker) since the grounded power source neutral provides a fault current path that causes a fuse or circuit breaker to blow or trip. Solid system grounding is made when the power source neutral is connected to ground without inserting any intentional impedance between the neutral and ground. The systems and methods facilitate the connection of single or split phase power source outputs to a utility grid. A power converter is connected between the power source and the DC bus and a power inverter is coupled between the DC bus and the utility grid. Without an isolation mechanism, the energy conversion efficiency is higher. In addition, the outputs of multiple power sources can be coupled together by a shared common DC bus.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems and methods for coupling a power source (e.g., a generator) to a utility grid enables the power source to be coupled to a utility ground (e.g., earth ground) through the utility grounded neutral. For many power sources, to meet safety requirements, a neutral output of the power source is connected to a solid ground. For example, a generator's neutral output is often coupled to the frame of the generator creating a ground that is referenced to 0V.

If the separate ground having a potential when referenced to utility ground is coupled to the utility ground, a ground loop of current will be formed, creating a potential safety hazard. Often, galvanic isolation (e.g., a transformer) is necessary to provide a mechanism of coupling the power source to a safety earth ground.

A transformerless power system enables the power source neutral to be connected to earth ground without forming a current ground loop and/or using galvanic isolation. The transfomerless power system can also couple multiple power sources together to a common dc bus such that each of the power systems includes a reference to earth ground.

These features and other features will be discussed in more detail below.

Figure 1:
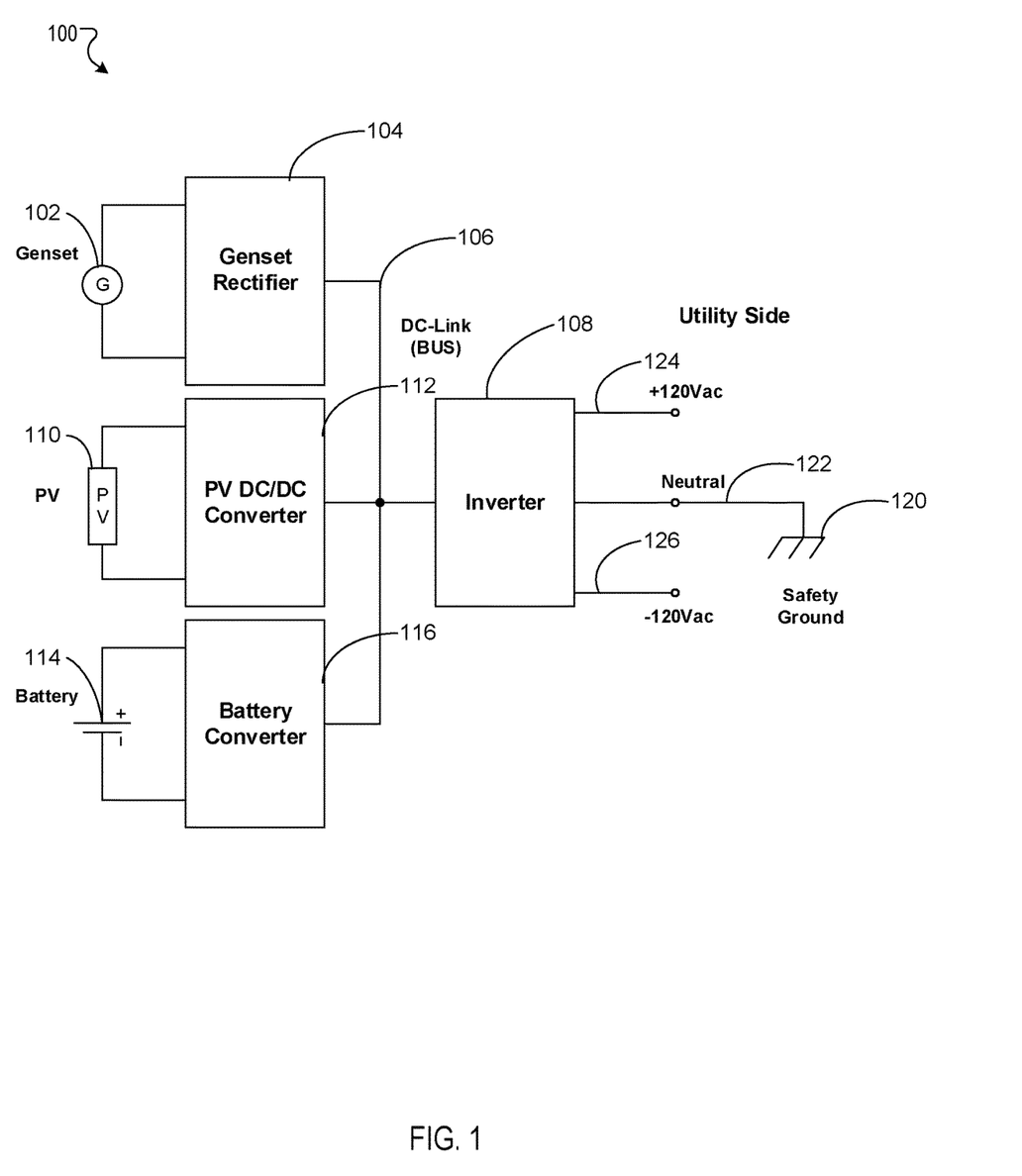
FIG. 1 is an example transformerless power system with multiple power sources coupled to a DC bus.

FIG. 1 is an example transformerless power system 100 with multiple power systems coupled to a DC bus. The example transformerless power system 100 can include a genset (e.g., a generator) 102, a genset rectifier 104, a DC-link (e.g., DC bus) 106, an inverter 108, a photovoltaic power source (PV) (e.g., solar panel) 110, a photovoltaic DC/DC converter 112, a battery 114, a battery converter 116, and a neutral terminal 122 coupled to safety ground (e.g., earth ground) 120. The transformerless power system 100 provides a mechanism to couple one or more individual power sources to safety ground.

The DC-link 106 is a DC bus that connects the genset rectifier 104, the PV DC/DC Converter 112, the battery converter 116, and the inverter 108 to one common bus. The DC-link 106 can be a DC-link capacitor circuit that capacitively couples the outputs of the power sources to inputs of the inverter 108. The DC-link 106 filters unwanted frequencies and/or voltages to ensure that a genset neutral output can be coupled to a utility neutral 122.

The genset 102 generates AC power that is rectified by the genset rectifier 104. The rectified output (e.g., DC power) is supplied to the DC-link 106. Typically, the genset 102 includes a neutral output (not shown in FIG. 1) that is connected to the genset 102 frame/enclosure, which may introduce a ground current loop. But as will be explained in greater detail below, the neutral output in systems that incorporate the features of this writer description is coupled to a neutral terminal 122 through the DC-link 106, which is further connected to safety ground. This enables the genset 102 to have a ground that is equal to earth ground.

The transformerless power system 100 may, in some implementations, only include the genset 102 and the genset rectifier as a power source. Alternatively or in addition, other power sources can also be coupled to the DC Link 106. In FIG. 1, the PV 110 can be a typical solar panel or an array of solar panels that generate DC power by electrons that are excited by the presence of light. The PV DC/DC converter 112 converts the generated DC output of the PV 110 to a DC output (e.g., DC voltage) that enables the PV DC/DC converter 112 output to be coupled with the DC-link 116. For example, the output of the PV 110 may be 15 VDC, but the DC-link 106 may be +/−48 VDC. Thus, the PV DC/DC converter 112 converts the 15 VDC to +/−48 VDC so that the output voltage of the PC DC/DC converter 112 is compatible with the DC-link 106.

The battery 114 is a typical energy storage device that can provide DC power at a particular voltage for a predetermined amount of time according to the capacity of the battery 114. Similar to the PV 110 and the PV DC/DC converter 112, the battery typically provides DC power at a particular voltage and the particular voltage may not be compatible with the DC-link 106. Accordingly, the battery converter 116 modifies the DC power output such that the output DC voltage is compatible with the DC-link 106.

The inverter 108 receives DC power from the DC-link 106, inverts the DC power to create an AC power outputs. In one implementation, the AC power outputs are +120 VAC 124 and −120 VAC 126. The AC outputs can also be +240 VAC and −240 VAC, according to the intended use, geographic location of the system, etc. The inverter also includes a neutral terminal 122 that is connected to safety ground 120.

In some implementations, the neutral terminal 122 is connected to a neutral terminal (not shown) on the DC-link 106. Typically, the PV DC/DC converter 112 and the battery converter 116 each includes two output terminals (e.g., a positive output terminal and a negative output terminal). In some implementations, each of the positive and negative output terminals of the battery converter 116 and the PV DC/DC converter 112 are respectively connected to a positive and negative terminal of the DC-link 106. In other implementations, one output terminal of each the PV DC/DC converter 112 and the batter converter 116 is also connected to the neutral terminal on the DC-link 106.

An example transformerless power system 100 is described with reference to FIG. 2, which is a detailed example of a transformerless power system 200 with a split phase power source coupled to the DC bus. The transformerless power 200 includes two gensets, genset 1 202a and genset 2 202b, a genset rectifier 104, a DC-link 106, EMI chokes 206a, 206b, fuse 1 and fuse 2 208a, 208b, and an inverter 108. In this instance, genset 1 and genset 2 202a, 202b, the genset rectifier 104, the DC-link 106, and the inverter 108 are similar to the like components discussed in the context of FIG. 1.

The two fuses 208a, 208b provide protection mechanisms for the transformerless power system 200. For example, in the event of an over current or ground fault situation, the fuses 208a, 208b will disconnect the two gensets 202a, 202b from the remainder of the circuit to protect the components that receive power from the two gensets 202a, 202b.

The power source (e.g., two gensets 202a, 202b) has a power source neutral 210, a first phase output 204a and second phase output 204b forming split phase outputs. In some implementations, the two gensets 202a, 202b produce two independent outputs 204a, 204b that can include different phases. For example, genset 1 202a can produce an output 204a that has a voltage with a 60 VAC, 60 Hz, and with a phase that can be referenced to 0 (e.g., the phase that other phases are referenced to). Genset 2 202b can produce an output 204b that has a voltage with a 60 VAC, 60 Hz, and a phase that is 180 degrees out of phase with reference to the output 208a phase of genset 1 202a. The split phase outputs 202a, 202b of the two gensets 202a, 202b facilitate bi-polar inverter outputs 124, 126 (e.g., +120 VAC and −120 VAC) for transformerless power system 200.

The two gensets 202a, 202b include independent neutral outputs that can be coupled together to form one genset neutral output 210. Alternatively, if the power source is a single generator system that produces a split phase output, a single neutral is provided The example transformerless power system 200 can have one or more sets of electromagnetic induction (EMI) chokes 206a, 206b. The EMI chokes 206a, 206b reduce the amount of interference that can be caused by power electronic converters. The EMI chokes 206a, 206b can filter out the unwanted stray current so that the unwanted stray current does not interfere with the operation of downstream components.

The genset rectifier 104 includes two input terminals 212a, 212b, two rectifier output terminals 214a, 214b, and rectifier switches SW1, SW2, SW3, and SW4. The genset rectifier 104 is coupled to the two gensets 202a, 202b to rectify the two genset outputs 204a, 204b. The switches can be power semiconductor switches (e.g., MOSFET, IGBT, etc.) The genset rectifier 104 switches SW1, SW2, SW3, and SW4 are driven according to a rectification timing process to rectify the split phase outputs from split phase AC power signals to bipolar DC power signal (e.g., a positive and negative outputs). For example, the genset rectifier 104 can have a +48V reference voltage at the first rectifier output terminal 214a and a −48V reference voltage at the second rectifier output terminal 214b.

In some implementations, the first phase input terminal 212a of the genset rectifier 104 is connected to the first phase output 204a of genset 1 202a. Also, the second phase input 212b of the genset rectifier 104 is connected to the second phase output 204b of genset 2 202b. The rectifier includes rectifier circuitry (e.g., switches SW1, SW2, SW3, and SW4) that rectifies a first phase output and a second phase output of the power source to generate respective first and second rectified outputs on the first and second rectifier output terminals 214a, 214b. The genset rectifier includes a rectifier neutral 216a to receive a power source neutral (e.g., the genset neutral 210).

As previously described, the DC-link 106 is a DC bus for the genset 114 and the genset rectifier to feed power to the inverter 108. The DC-link 106 includes a midpoint 216 and capacitors C1, C2, C3, and C4. The capacitors filter unwanted voltage characteristics (e.g., frequencies, harmonics, ripples, etc.) from the genset rectifier outputs. The capacitors also enable the DC-link to have the midpoint 216. In some implementations, capacitors C1 and C3 can be combined and can be replaced by one capacitor (not shown) by finding one capacitor with a suitable capacitance for the design and implementation of the DC-link 106. Likewise, capacitors C2 and C4 can be combined and replaced by one capacitor (not shown).

The genset neutral 210 is connected to safety ground 120 by connecting the power source neutral (e.g., the genset neutral 210) to the midpoint 216. The midpoint 216 is connected to a rectifier neutral 218, which is then connected to the neutral terminal 122, which is further connected to safety ground 120. Thus, the power source neutral 210 is connected to the rectifier neutral 218 through the midpoint 216.

In some implementations, the midpoint 216 can include a node point 216a between the capacitors C1 and C2 that is connected to another node point 216b between the capacitors C3 and C4. In the example transformerless power system 200 configuration, a first capacitor (e.g., C1, C3, etc.) is connected between the first node 216a (e.g., rectifier neutral) and the first rectifier output terminal 214a. In addition, a second capacitor (e.g., C2, C4, etc.) is connected between the rectifier neutral 216a and the second rectifier output terminal 214b.

The inverter 106 includes two inverter input terminals 220a, 220b, two inverter output terminals 222a, 222b, and inverter circuitry that inverts the first and second rectified outputs that are provided by the first and second rectifier output terminals 214a, 214b. The inverter circuitry can include inverter switches SW5, SW6, SW7, and SW8 that are used to invert the rectified signals and are driven by an inverting timing process. The switches can be power semiconductor switches (e.g., MOSFET, IGBT, etc.) similar to the rectifier switches SW1, SW2, SW3, and SW4. The inverter switches SW5, SW6, SW7, and SW8 generate respective first and second AC outputs 124, 126 on the first and second inverter output terminals 222a, 222b, where the first and second AC outputs 124, 126 are referenced to the utility neutral 122.

Figure 2:
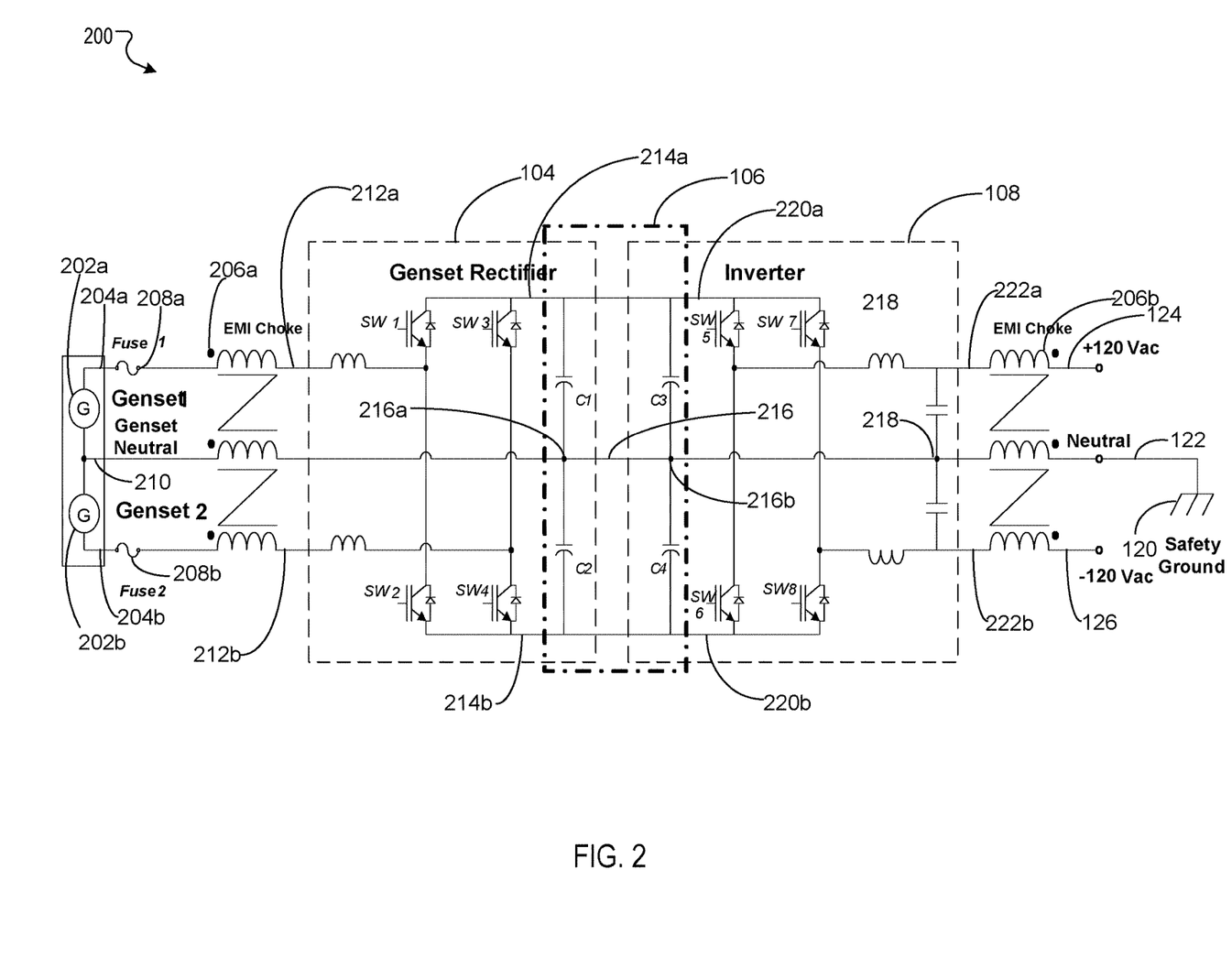
FIG. 2 is a detailed example of a transformerless power system with a split-phase power source coupled to the DC bus.

In the example configuration illustrated in FIG. 2, the first inverter input terminal 220a is connected to the first rectifier output terminal 214a and the second inverter input terminal 220b is connected to the second rectifier output terminal 214b. In addition, the third capacitor (e.g., C3) is connected between one node point 216b that is coupled to the inverter neutral 218 and the first inverter input terminal 220a and the fourth capacitor (e.g., C4) is connected between one node point 216b that is coupled to the inverter neutral 218 and the second inverter input terminal 220b.

As previously described, C1 and C3 can be replaced by one capacitor C5 (not shown) and C2 and C4 can be replaced by one capacitor C6 (not shown). In that implementation, the first capacitor C6 can be connected between the rectifier neutral 216a and the first rectifier output terminal 214a. The rectifier neutral 216a can be connected to the inverter neutral 218 and the first rectifier output terminal 214a can be connected to the first rectifier input terminal 220a. Likewise, the second capacitor C6 connected between the rectifier neutral 216a and the second rectifier output terminal 214b. Further, the second rectifier output terminal 214b can be connected to the first rectifier input terminal 220b. In this instance the first and second rectified outputs generate the first and second rectified outputs from split phase inputs that are received from the two rectifier input terminals 214a, 214b respectively connected to the first and second inputs 220a, 220b of the rectifier.

Figure 3:
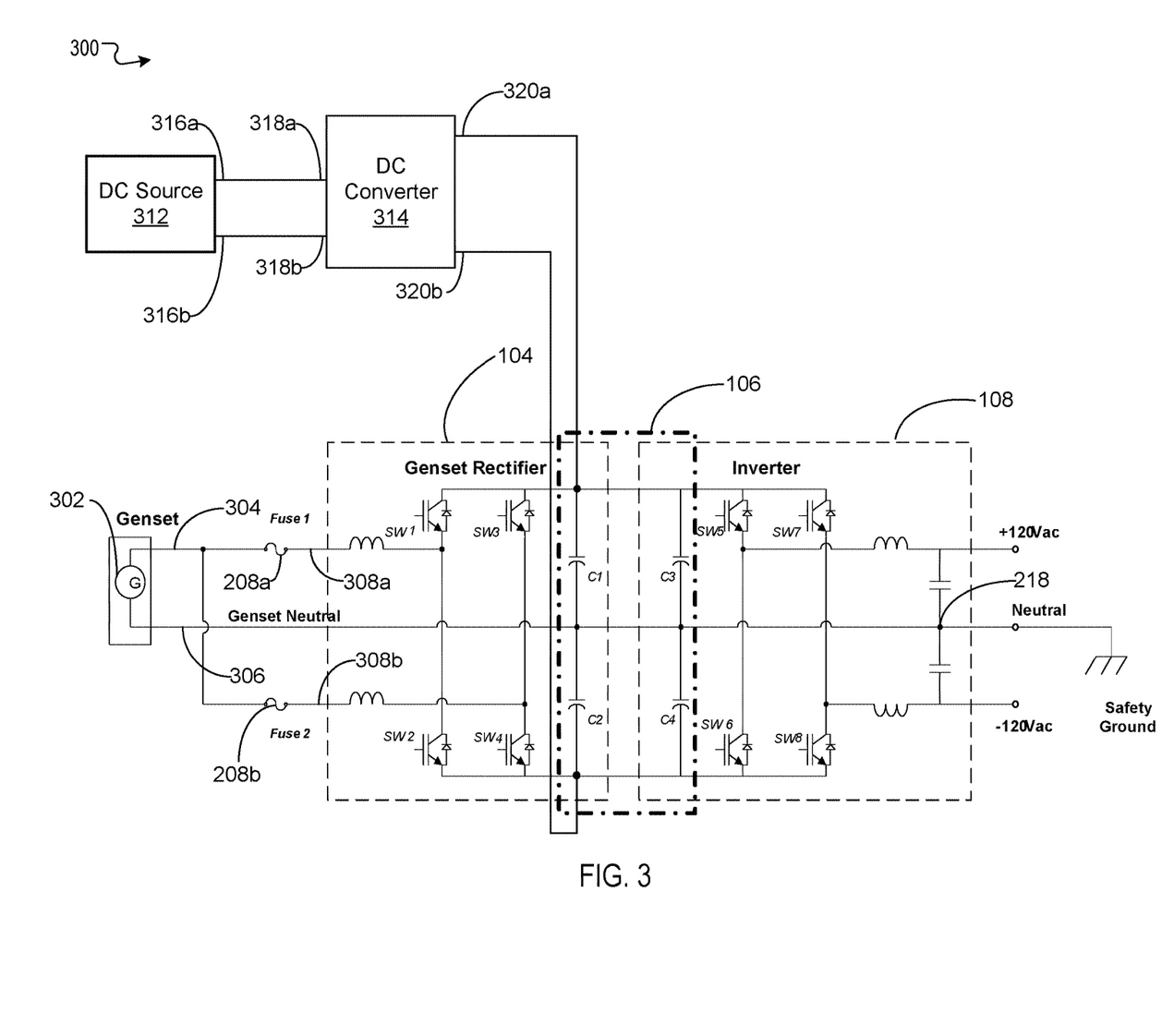
FIG. 3 is another detailed example of a transformerless power system that includes a single phase power source and another power source coupled to the DC bus.

The system 200 of FIG. 2 illustrates one example implementation that utilizes only a split phase power source and no additional power sources. However, additional power sources, such as those depicted in FIG. 1, can be connected to the DC-link 106. Likewise, a single phase power source may also be used instead of a split phase power source. For example, FIG. 3 is another detailed example of a transformerless power system 300 that includes a single phase power source and another power source coupled to the DC bus. The transformerless power system 300 includes a genset 302, a genset rectifier 104, a battery 312, a battery converter 314, a DC-link 106, fuse 1 and fuse 2 208a, 208b, and an inverter 108. In this instance, the genset 302, the genset rectifier 104, the DC-link 106, and the inverter 108 are similar to components discussed in the context of FIGS. 1 and 2.

In this example, however, the system 300 has a single phase power source (e.g., the genset 302) that has a single phase output 304 and a power source neutral (e.g., genset neutral 306). The single phase output 304 is connected to a first phase input terminal 308a of the rectifier 104 and the second input terminal 308b of the rectifier 104. Connecting the first and second phase input terminal 308a, 308b to the single phase output 302 allows for the neutral coupling described in more detail below.

Similar to the implementation discussed in the context of FIG. 2, the split phase output of the genset rectifier 104 is fed to the DC-link 106 and then inverter 108 to create a split phase AC output. For example, generating first and second rectified outputs includes generating the first and second rectified outputs from a single phase input connected to the first and second inputs (e.g., the first and second rectifier inputs coupled to the first and second rectifier input terminals).

The power source neutral (e.g., the genset neutral 306) is connected to the rectifier neutral 218. The rectifier neutral is coupled to safety ground. Thus, the neutral output of the power source is connected to earth ground. The configuration illustrated in FIG. 3 enables the genset to be connected to earth ground by using the DC-link to connect the inverter neutral 218 to the genset neutral 306.

As previously discussed in connection with FIG. 1, the transformerless power system 300 can include different power sources. For example, the transformerless power system 300 can have a DC source 312 with a first and second DC source output 316a, 316b that has a reference voltage equal to the DC source voltage.

The DC converter 314 has a DC converter first input terminal 318a that receives the first DC source output 316a and a DC converter second input terminal 318b that receives the second DC source output 316b. The DC converter 314 also has a DC converter first and second DC converter output terminals 320a, 320b.

The DC converter 314 includes DC converter circuitry that converts the DC source first output 316a and the DC source second output 316b to generate respective second converter first and second outputs on second converter first and second output terminals 320a, 320b. In some implementations, a first voltage (e.g., the DC source voltage) of the DC source first output 316a and second output 316b is different relative to a second voltage of the second converter first and second outputs on second converter first and second output terminals 320a, 320b. For example, the DC source voltage, which can be 15V, passes through the DC converter 314, and the DC converter 314 converters the voltage to +/−48V. Thus the voltage seen at the first and second DC converter output terminals 318a, 318b is 12V.

The DC-link 106 first capacitor C1 is connected between the rectifier neutral 218 and the DC converter first output terminal 320a. In addition, the DC-link second capacitor C2 is connected between the rectifier neutral 218 and the DC converter second output terminal 318b.

Figure 4:
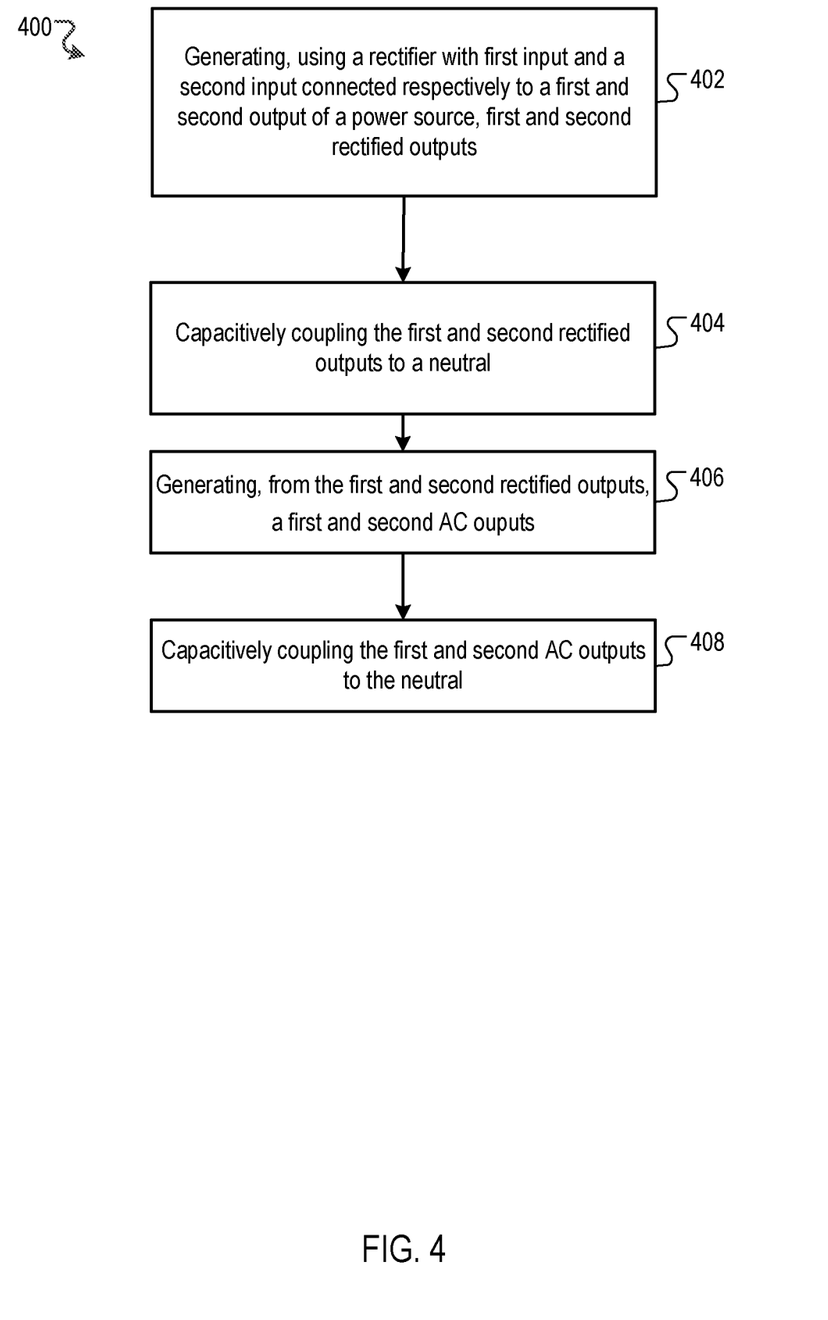
FIG. 4 is a flow diagram describing a process for coupling a power source to ground.

FIG. 4 is a flow diagram describing a process 400 for coupling a power source to ground (e.g., earth ground, reference ground, safety ground, etc.). Generally, the process 400 is executed by an apparatus such as the systems of FIG. 1, 2 or 3. The process generates, using a rectifier with a first input and a second input connected respectively to a first and second output of a power source, first and second rectified outputs (402). The power source generates AC power that is converted to DC power. The AC power input can include split phase outputs, such as shown in FIG. 2, or a single phase tied to the rectifier inputs, as shown in FIG. 3.

The DC power is provided to a DC bus. For example, the DC bus can capacitively couple the first and second rectified outputs to a neutral, e.g., by coupling the first and second rectified outputs to a neutral (404). The neutral can include the power source neutral coupled to a node that is formed between two or more capacitors. In some implementations, the two or more capacitors can be included in the DC bus circuitry.

The process 400 generates, from the first and second rectified outputs, a first and a second AC output (406). For example, the first and second rectified outputs can be inverted to create the first and second AC outputs. The first and second outputs can be coupled to the utility grid.

The first and second outputs have a voltage that is referenced to the neutral. The process capacitively couples the first and second AC outputs to the neutral (408). The neutral is connected to safety ground 120 effectively connecting the power source neutral 306 to safety ground 120.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

The operations described in this specification can be implemented as operations performed by a data processing apparatus on data stored on one or more computer-readable storage devices or received from other sources.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a power system, comprising:
   coupling each of the one or more power source neutrals to a rectifier neutral of a rectifier;
   coupling an inverter neutral of an inverter to the rectifier neutral;
   rectifying, by the rectifier, phase output signals from the one or more power sources to generate respective rectified outputs;
   capacitively coupling the rectified output to the rectifier neutral;
   inverting, by the inverter, each respective rectified output to generate respective AC outputs;
   referencing the AC outputs from the inverter neutral;
   wherein the respective AC outputs are referenced to a utility neutral by coupling the utility neutral to the same neutral formed by the coupled rectifier neutral and inverter neutral.

2. The method of claim 1, wherein at least one of the power sources is a generator.

3. The method of claim 1, further comprising:
   connecting a first input terminal of a converter to receive a first power output of a second power source that is separate from the one or more power sources;
   connecting a second input the converter to receive a second power output of the second power source;
   converting the second power source first power output and the second power source second power output to generate respective converted first and second outputs;
   capacitively coupling the rectifier neutral and the converted first output; and
   capacitively coupling the rectifier neutral and the converted second output.

4. The method of claim 3, wherein the first power source includes a generator.

5. The method of claim 3, wherein the second power source includes a photovoltaic system.

6. The method of claim 3, wherein the second power source includes a battery.

7. The method of claim 1, further comprising connecting the neutral output of the power source to earth ground.

\* \* \* \* \*